(12) United States Patent
Tsai (10) Patent No.: US 9,615,020 B2
(45) Date of Patent: Apr. 4, 2017

(54) AUTO FOCUS METHOD AND APPARATUS USING THE SAME

(71) Applicant: VIVOTEK INC., New Taipei (TW)

(72) Inventor: Chia-Lun Tsai, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/077,388

(22) Filed: Mar. 22, 2016

(65) Prior Publication Data

US 2016/0286117 A1 Sep. 29, 2016

(30) Foreign Application Priority Data

Mar. 27, 2015 (TW) .............................. 104110143 A (51) Int. Cl.
*G03B 13/00* (2006.01)
*H04N 5/232* (2006.01)
*H04N 5/235* (2006.01)
*G03B 13/36* (2006.01)

(52) U.S. Cl.
CPC ......... *H04N 5/23212* (2013.01); *G03B 13/36* (2013.01); *H04N 5/2353* (2013.01)

(58) Field of Classification Search
CPC .. H04N 5/2356; H04N 5/23212; G03B 13/36; G03B 7/28; G02B 7/09; G02B 7/28; G02B 7/36; G02B 7/365; G02B 7/38; G06T 2207/10148; G06T 5/003; G06T 5/004
USPC .................................................. 348/345–357
See application file for complete search history.

(56) References Cited

U.S. PATENT DOCUMENTS

| | | | | |
|---|---|---|---|---|
| 4,762,987 A | * | 8/1988 | Ishida | G02B 7/34 250/201.8 |
| 2008/0208499 A1 | * | 8/2008 | Miyashita | G01M 11/0264 702/82 |
| 2010/0066874 A1 | * | 3/2010 | Ishiga | G06T 5/002 348/252 |
| 2012/0308154 A1 | * | 12/2012 | Tezaur | G06T 5/003 382/274 |
| 2013/0182961 A1 | * | 7/2013 | Tay | G02B 7/36 382/199 |
| 2014/0146221 A1 | * | 5/2014 | Kimura | G03B 13/36 348/353 |
| 2014/0168502 A1 | * | 6/2014 | Georgy | G02B 7/285 348/349 |
| 2014/0362278 A1 | * | 12/2014 | Kawarada | H04N 5/23212 348/349 |
| 2015/0348244 A1 | * | 12/2015 | Zimmer | G06T 5/003 382/167 |
| 2016/0048967 A1 | * | 2/2016 | Mitzkus | G02B 21/244 382/103 |

(Continued)

*Primary Examiner* — Chia-Wei A Chen
(74) *Attorney, Agent, or Firm* — Andrew M. Calderon; Roberts, Mlotkowski, Safran Cole & Calderon, P.C.

(57) ABSTRACT

An auto focus method includes (a) obtaining a selected exposure value and an un-normalized contrast value; (b) executing a normalized contrast value obtaining procedure at each of the stepping positions; and (c) executing a focal point searching procedure according to the normalized contrast values. Accordingly, the normalization procedure is applied to eliminate the effect of the exposure value on the contrast value, so that the focal point of the image can be obtained correctly. In addition, an image capturing apparatus using the focus method is provided.

20 Claims, 8 Drawing Sheets

(56) References Cited

U.S. PATENT DOCUMENTS

| | | | |
|---|---|---|---|
| 2016/0057338 A1* | 2/2016 | Chen | H04N 5/23212 348/345 |
| 2016/0057341 A1* | 2/2016 | Nakayama | G06T 7/0069 348/207.1 |
| 2016/0205309 A1* | 7/2016 | Hamano | H04N 5/23212 348/353 |

* cited by examiner

AUTO FOCUS METHOD AND APPARATUS USING THE SAME

CROSS-REFERENCES TO RELATED APPLICATIONS

This non-provisional application claims priority under 35 U.S.C. §119(a) on Patent Application No. 104110143 filed in Taiwan, R.O.C. on Mar. 27, 2015, the entire contents of which are hereby incorporated by reference.

BACKGROUND

Technical Field

The instant disclosure relates to an auto focus method and an apparatus using the same, and particularly relates to an auto focus method and an apparatus using the same in which auto exposure and auto focus functions are performed at the same time.

Related Art

One of the auto focus (AF) methods for image capturing apparatus is the contrast focus method. In the contrast focus method, the lens of the image capturing apparatus is moved, an image is obtained at each of the stepping positions, and contrast values of the obtained images are calculated. And then, the image capturing apparatus compares all the contrast values and taking the stepping position corresponding to the maximum contrast value as the focal point. The image capturing apparatus further has an auto exposure (AE) function. In the auto exposure function, the aperture and the shutter of the image capturing apparatus are adjusted according to the environmental brightness and preset output brightness during the image capturing apparatus obtains images, and the adjustments of the aperture and the shutter will change the amount of incident lights into the lens. Accordingly, the images obtained by the image capturing apparatus have a uniform brightness.

However, during the image capturing apparatus performs auto focus function, if the image capturing apparatus also performs the auto exposure function at the same time, the exposure values of the obtained images would be affected in response to the adjustments of the aperture and the shutter. Therefore, the brightness of the obtained images is changed and the contrast values of the obtained images are affected accordingly. Hence, an error would be generated in determining the values of the contrast values.

Accordingly, the image capturing apparatus would misdetermine the focal point.

To solve the aforementioned problems, a conventional approach is to lock the auto exposure function during the image capturing apparatus performs the auto focus function, and the auto exposure function can be launched until the focal point is founded. However, during the image capturing apparatus performs the auto focus function, if the obtained images are overexposure or underexposure, the image capturing apparatus is unable to perform the auto focus function due to the auto exposure function is locked, and consequently the user may feel the response time of the auto exposure function is too long. On the other hand, if the auto focus function is activated after the completion of the auto exposure function, the user may feel the response time of the auto focus function is too long.

SUMMARY

In view of these, embodiments of the instant disclosure provide an auto focus method and an apparatus using the same. Accordingly, the auto focus function and the auto exposure function can be performed by the apparatus at the same time, and the focal point can be determined correctly. Hence, the system effectiveness of the apparatus can be improved efficiently.

An embodiment of the instant disclosure provides an auto focus method, comprising:

Step a: obtaining a selected exposure value and an un-normalized contrast value, wherein the un-normalized contrast value corresponds to a stepping position;

Step b: executing a normalized contrast value obtaining procedure which comprises: step b1: obtaining a next un-normalized contrast value and a next exposure value of a next image at a next stepping position; step b2: determining if the next exposure value and the selected exposure value satisfy a renew condition, and the renewing the selected exposure value when the next exposure value and the selected exposure value satisfy the renew condition; and step b3: obtaining a normalized contrast value corresponding to the un-normalized contrast value and a next normalized contrast value corresponding to the next un-normalized contrast value according to the renewed selected exposure value; and Step c: executing a focal point searching procedure according to the normalized contrast value and the next normalized contrast value, wherein the focal point searching procedure comprises: step c1: determining if a reverse condition is satisfied according to the normalized contrast values; step c2: outputting the stepping position corresponding to the maximum of the normalized contrast values if the reverse condition is satisfied; and step c3: executing the normalized contrast value obtaining procedure if the reverse condition is not satisfied.

According to the embodiment of the instant disclosure, a normalized procedure is applied to eliminate the effect of the exposure value on the contrast value, so that a correct focal point of the image can be obtained, and the system efficiency can be improved efficiently.

An embodiment of the instant disclosure is an image capturing apparatus for executing an auto focus method, wherein the method comprises:

Step a: obtaining a selected exposure value and an un-normalized contrast value, wherein the un-normalized contrast value corresponds to a stepping position;

Step b: executing a normalized contrast value obtaining procedure which comprises: step b1: obtaining a next un-normalized contrast value and a next exposure value of a next image at a next stepping position; step b2: determining if the next exposure value and the selected exposure value satisfy a renew condition, and the renewing the selected exposure value when the next exposure value and the selected exposure value satisfy the renew condition; and step b3: obtaining a normalized contrast value corresponding to the un-normalized contrast value and a next normalized contrast value corresponding to the next un-normalized contrast value according to the renewed selected exposure value; and Step c: executing a focal point searching procedure according to the normalized contrast value and the next normalized contrast value, wherein the focal point searching procedure comprises: step c1: determining if a reverse condition is satisfied according to the normalized contrast values; step c2: outputting the stepping position corresponding to the maximum of the normalized contrast values if the reverse condition is satisfied; and step c3: executing the normalized contrast value obtaining procedure if the reverse condition is not satisfied.

BRIEF DESCRIPTION OF THE DRAWINGS

The disclosure will become more fully understood from the detailed description given herein accompanying by the following figures, which are illustration only, and thus not limitative of the disclosure, wherein.

DETAILED DESCRIPTION

Figure 1:
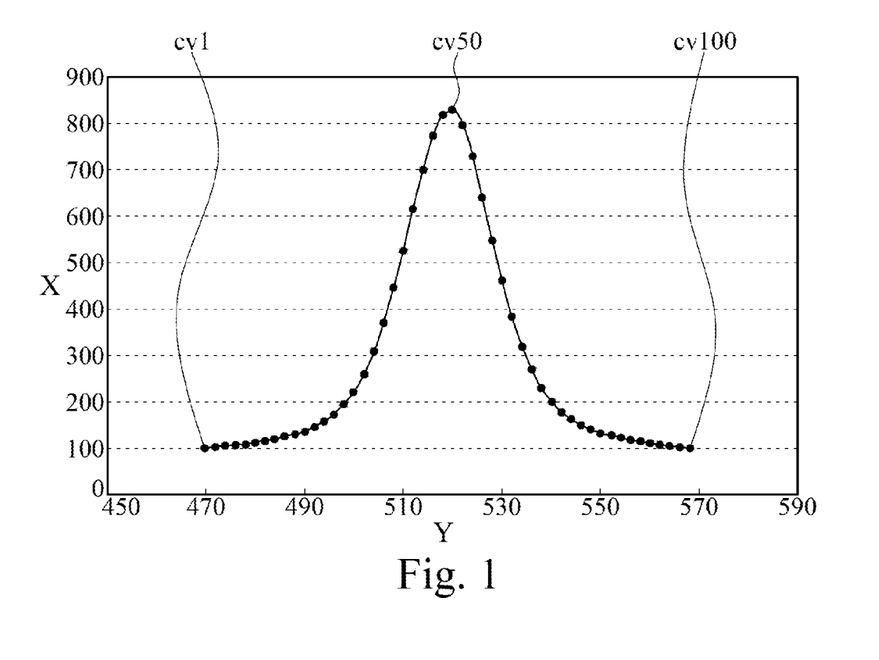
FIG. 1 illustrates a graph of the average contrast values at each of the stepping positions.

FIG. 1 illustrates a graph of the average contrast values at each of the stepping positions. The X axis shown in FIG. 1 represents the value of the stepping position, namely, the displacement change of a focus lens. The Y axis shown in FIG. 1 represents the change of the contrast value (or called convolution value) of the image. In detail, in the auto focus procedure, an image is obtained at each of the stepping positions, and the average contrast value of each of the images is calculated. Commonly, the contrast value of an image is calculated by applying a high pass filter to perform a convolution procedure to the image so as to obtain the convolution value of the image. In other words, the average convolution value of the image is the contrast value of the image. Generally, the higher the contrast value of an image is, the better the sharpness of the image is. In FIG. 1, each of the points represents the contrast values of the image at each of the stepping positions. Therefore, FIG. 1 also represents the change of the sharpness of the image during a focus procedure.

The contrast focus method utilizes the change of the contrast values to figure out the focus position at where the image has the highest sharpness; i.e., it is supposed that, the higher the contrast value of an image is, the better the sharpness of the image is. In FIG. 1, ev1 represents the contrast value of an image obtained at a first stepping position, and cv100 represents the contrast value of the image obtained at a last stepping position. As shown in FIG. 1, the highest contrast value is the peak of the curve, that is, the point cv50. Therefore, cv50 has the highest contrast value. In the contrast focus method, a point having the highest contrast value represents the point's sharpness is the highest, and the stepping position corresponding to the point having the highest contrast value is the focal point.

In addition to the auto focus function which ensures the image to have a sufficient sharpness, an image capturing apparatus further has an auto exposure function. During the auto exposure procedure, the image capturing apparatus calculates the amount of light of a current capturing image according to a default metering mode or a user-selected metering mode, so that the exposure value for image capturing can be adjusted to meet a preset output brightness. Hence, overexposure or underexposure of the image can be prevented.

Figure 2A:
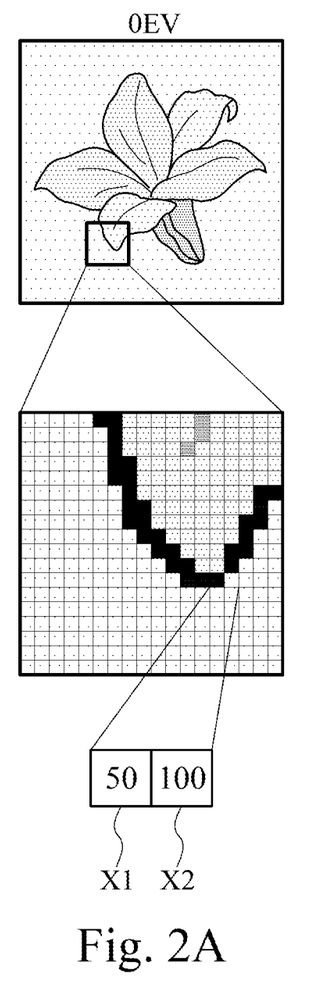
FIG. 2A illustrates a schematic view of the image contrast values of an image when the exposure value is 0 EV.

FIG. 2A illustrates a schematic view of the image contrast values of an image when the exposure value is 0 EV. Firstly, an image as shown in FIG. 2A is obtained when the exposure value is 0 EV. Since a digital image includes a plurality of pixels, the contrast value of an image is a difference value between the pixel values of adjacent pixels. For example, in FIGS. 2A and 2B, the pixel values of the pixels X1 and X2 are respectively 50 and 100, and the difference value of the pixel values of the image is 100−50=50. In a processor computation, a convolution approach is applied; that is, a high pass filter having a filter value of Filter [1~−1] is applied to the pixels to perform convolution to the two pixels X1 and X2 [50, 100] shown in FIG. 2A, so that a contrast value of 50 is obtained.

Figure 2B:
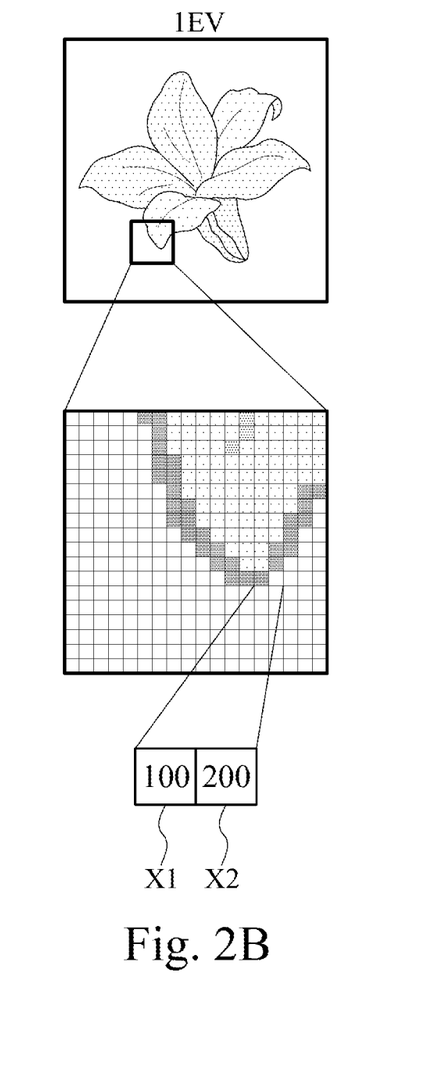
FIG. 2B illustrates a schematic view of the image contrast values of the image in FIG. 2A when the exposure value is +1 EV.

FIG. 2B illustrates a schematic view of the image contrast values of the image in FIG. 2A when the exposure value is +1 EV. In other words, the images illustrated in FIGS. 2A and 2B are obtained at the same stepping position but with different exposure values, i.e., 0 EV and +1 EV, respectively. As shown, the pixel values obtained at the same points (X1, X2) are [100, 200]. And then, a high pass filter having a filter value of Filter [1~−1] is applied to the pixels to perform convolution to the two pixels shown in FIG. 2B, and a contrast value of 100 is obtained. When the exposure value of the image is changed, the brightness of the image is consequently changed and the contrast value of the image is changed, too. In fact, the images of FIGS. 2A and 2B are obtained by the apparatus's capturing the same scene at the same stepping position. Hence, the sharpness of the images should be the same. However, in the above example, the images of FIGS. 2A and 2B obtained at different exposure values have different contrast values and the sharpness will be regarded as different, which is not correct.

The pixel value for calculating the convolution value may be a single-colored gray-scale value, any value of the RGB values, or an overall RGB value. Even more, pixels obtained from other chromatic coordinates can be applied to calculate the convolution value as well.

Normally, the auto focus function and the auto exposure function are continuously executing during the focus procedure of video recording or image capturing. When the metering mode is changed, when the ambient brightness is changed, or when the scene of the image is dramatically changed, the auto exposure function may determine that the brightness is improper for the focus procedure so as to adjust the exposure value. Therefore, conditions illustrated in FIGS. 2A and 2B would occur.

Figure 3:
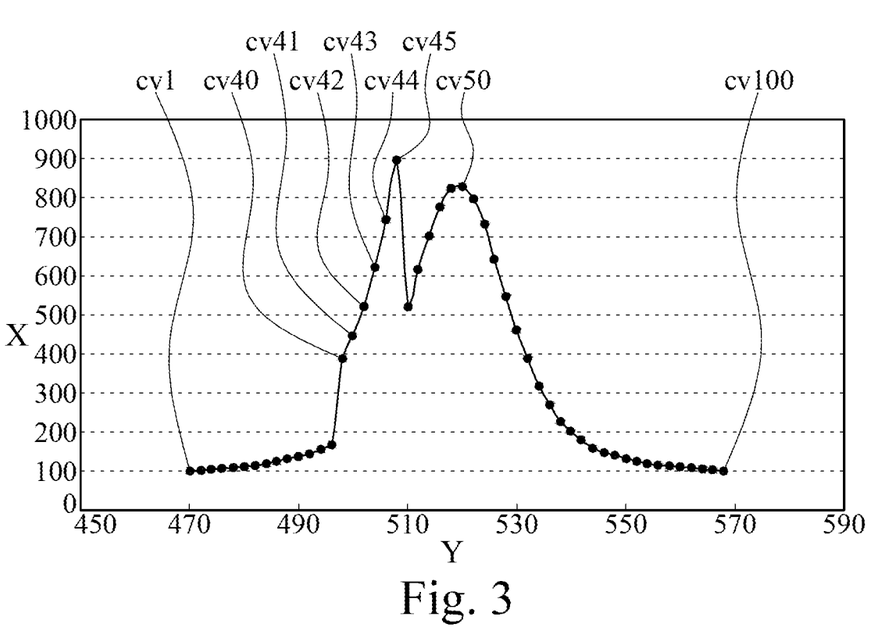
FIG. 3 illustrates a graph of the average contrast values at each of the stepping positions in varied exposure values during the focus procedure.

FIG. 3 illustrates a graph of the average contrast values at each of the stepping positions in varied exposure values during the focus procedure. In FIG. 3, the points cv40 to cv45 are obtained with the exposure value of +1 EV; the rest of the points of the image are obtained with the exposure value of 0 EV. When the same high pass filter is applied to obtain the convolution values of the image, a graph as shown in FIG. 3 can be obtained.

Because the average contrast value of the image obtained in the exposure value of +1 EV is twice of the average contrast value of the image obtained in the exposure value of 0 EV, the point having the highest contrast value will be cv45, instead of cv50. Therefore, the focal point cannot be determined correctly.

Figure 4:
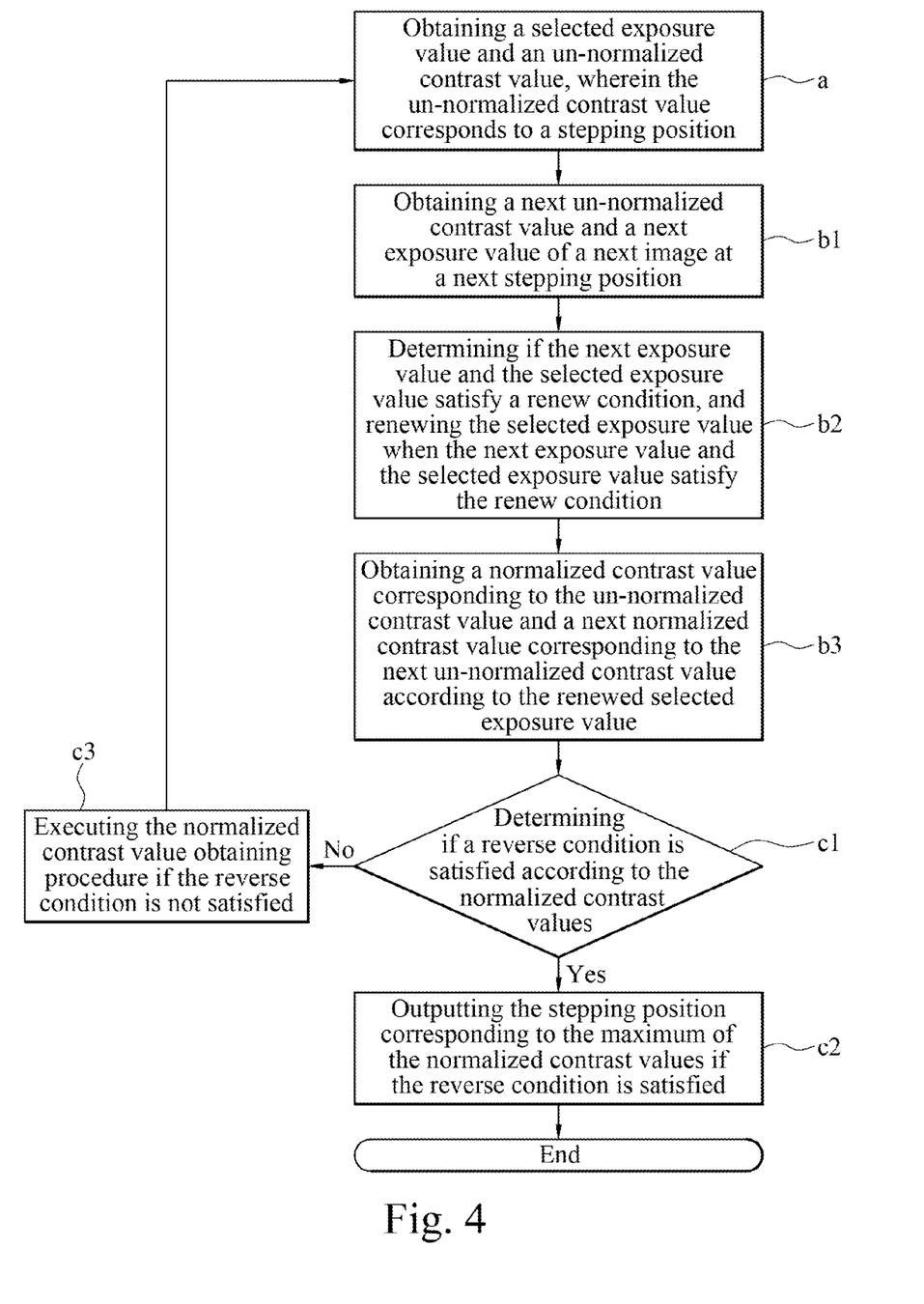
FIG. 4 illustrates a flowchart of one embodiment of the instant disclosure.

FIG. 4 illustrates a flowchart of one embodiment of the instant disclosure. In order to prevent the focus result from being affected by the change of the exposure value during the focus procedure, an embodiment of the instant disclosure provides an auto focus method. The method comprises (a) obtaining a selected exposure value and an un-normalized contrast value, wherein the un-normalized contrast value corresponds to a stepping position; (b1) obtaining a next un-normalized contrast value and a next exposure value of a next image at a next stepping position; (b2) determining if the next exposure value and the selected exposure value satisfy a renew condition, and renewing the selected exposure value when the next exposure value and the selected exposure value satisfy the renew condition; and (b3) obtaining a normalized contrast value corresponding to the un-normalized contrast value and a next normalized contrast value corresponding to the next un-normalized contrast value according to the renewed selected exposure value (the processes b1 to b3 are collectively called a normalized contrast value obtaining procedure (b)); and (c1) determining if a reverse condition is satisfied according to the normalized contrast values; (c2) outputting the stepping position corresponding to the maximum of the normalized contrast values if the reverse condition is satisfied; and (c3) executing the normalized contrast value obtaining procedure if the reverse condition is not satisfied (the processes c1 to c3 are called a focal point searching procedure (c)). In the method, the normalization procedure is applied to eliminate the effect of the exposure value on the contrast value. Therefore, the contrast value of the image can be prevented from being determined incorrectly, and the focal point can be determined correctly.

In the normalized contrast value obtaining procedure (b), following embodiments can be applied thereto. According to an auto focus method of a first embodiment of the instant disclosure, a minimum exposure value is taken as the selected exposure value. In other words, the renew condition means the next exposure value is taken as the selected exposure value when the next exposure value is less than the selected exposure value. That is, the minimum of all the exposure values obtained at different stepping positions is taken as the selected exposure value.

During the focusing procedure, a first image, a first exposure value, and a first contrast value are obtained at a first stepping position. The first exposure value and the first contrast value correspond to the first image. In the step, the first exposure value is set as the selected exposure value, and the first contrast value is set as the un-normalized contrast value.

And then, a second image, a second exposure value, and a second contrast value are obtained at a second stepping position. The second exposure value and the second contrast value correspond to the second image. The second exposure value is determined if it is less than the first exposure value. If the second exposure value is greater than the first exposure value, the first exposure value is still taken as the selected exposure value; while if the second exposure value is less than the first exposure value, then the second exposure value is taken as the selected exposure value. Next, the normalized contrast value at the first stepping position is calculated and obtained according to the new selected exposure value, the first contrast value, and the first exposure value. And, the normalized contrast value at the second stepping position is calculated and obtained according to the new selected exposure value, the second contrast value, and the second exposure value.

Next, a third image, a third exposure value, and a third contrast value are obtained at a third stepping position. The third exposure value and the third contrast value correspond to the third image. The third exposure value is determined if it is less than the selected exposure value. If the third exposure value is greater than the selected exposure value, the selected exposure value is remained; while if the third exposure value is less than the selected exposure value, the third exposure value is taken as the selected exposure value. Next, the normalized contrast value at the third stepping position is calculated and obtained according to the new selected exposure value, the third contrast value, and the third exposure value. And, the normalized contrast values at the first and second stepping positions are recalculated and re-obtained according to the new selected exposure value.

Similarly, the exposure values and contrast values at a fourth stepping position, a fifth stepping position . . . and a last stepping position are calculated and obtained. When the renew condition is satisfied, i.e., when an even smaller exposure value is available, the selected exposure value is renewed by the smaller exposure value, the normalized contrast values at different stepping positions which are satisfied with the renewed selected exposure value are calculated and obtained, and the normalized contrast values at different stepping positions which are already obtained are renewed accordingly.

According to the first embodiment of the instant disclosure, the auto focus method utilizes a normalization formula to obtain the normalized contrast value.

The normalization formula is $$CV_n = CV_i \times 2^{EV_{min} - EV_i}$$

Wherein, $CV_n$ is the normalized contrast value, $CV_i$ is the un-normalized contrast value of the image obtained at the i-th stepping position, $EV_{min}$ is the selected exposure value, and the $EV_i$ is the exposure value of the image obtained at the i-th stepping position.

According to the method, the un-normalized contrast value is the average value of the convolution values of a plurality of selected pixels of each of the images corresponding to the corresponding stepping position. The selected pixels may comprise all the pixels of the image.

The calculation of the contrast value of the image corresponding to each of the stepping positions is described as:

$$Filter = [a_1\ a_2\ \ldots\ a_n]$$

$$CON = [a_1 X1 + a_2 X2 + \ldots + a_n Xn]$$

$$CV = (\text{Sum of all } CON) / CV_{count}$$

Wherein, Filter means a high pass filter for obtaining the convolution value of the image, $a_1 \sim a_n$ are the filter value (or called the weighting parameter for calculating the convolution value), $X1 \sim Xn$ are the pixel values (commonly, the brightness values are taken as the pixel values), CON is the convolution value of the image, Sum of all CON is the summation of all the convolution values, and $CV_{count}$ is the counting amount of all the convolution values.

Take a simple example, when a high pass filter Filter[1~−1] is applied, the convolution value of the two pixels X1 and X2 at the same stepping position shown in FIGS. 2A and 2B are presented as following.

When the exposure value is 0 EV:

Filter=[1 −1]

$CON=[1\times50+-1\times100]$ $CV=(-50)/1$ $CV_n=50\times2^{0-0}=50$

When the exposure value is +1 EV:

Filter=[1 −1]

$CON=[1\times100+-1\times200]$ $CV=(-100)/1$ $CV_n=100\times2^{0-1}=50$

Accordingly, the incorrect contrast value caused by the change of the exposure value can be corrected by the normalization step, and the contrast value can be prevented from being determined incorrectly.

In a second embodiment of the instant disclosure, a maximum exposure value $EV_{max}$ is taken as the selected exposure value. In other words, the renew condition means the next exposure value is taken as the selected exposure value when the next exposure value is greater than the selected exposure value. That is, the maximum of all the exposure values obtained at different stepping positions is taken as the selected exposure value.

The normalization formula of the second embodiment is $CV_n=CV_i\times2^{EV\,max-EVi}$.

Wherein, $CV_n$ is the normalized contrast value, $CV_i$ is the un-normalized contrast value of the image obtained at the i-th stepping position, $EV_{max}$ is the selected exposure value, and the $EV_i$ is the exposure value of the image obtained at the i-th stepping position.

Similarly, the convolution value of the two pixels shown in FIGS. 2A and 2B are calculated as following.

When the exposure value is +1 EV, $CV=100\times2^{1-1}=100$.
When the exposure value is 0 EV, $CV=50\times2^{1-0}=100$.

Accordingly, the incorrect contrast value caused by the change of the exposure value can be corrected by the normalization step, and the contrast value can be prevented from being determined incorrectly.

Moreover, when some of the pixels receive light with intensity higher than their saturation intensities, those pixels will output their highest values. Therefore, all the oversaturated pixels are unable to output corresponding pixel values in accordance with the received intensities. For example, when the highest value the hardware (the pixels) can express (output) is 255, all the oversaturated pixels will be outputted as 255. Accordingly, an error in the calculation of the contrast value would occur.

Therefore, according to an auto focus method of a third embodiment of the instant disclosure, the convolution value of the selected pixels is the convolution value of all the pixels of the image excluding the convolution value of oversaturated pixels of the image. The oversaturated pixel is a pixel having a pixel value greater than an oversaturation threshold.

In obtaining the contrast value according to the embodiment, following calculations are carried out:

Filter=[$a_1$ $a_2$ ... $a_n$]

$CON_1=[a_1X1+a_2X2+\ldots+a_nXn]$ if $X_1\,X_2\ldots Xn$<saturation_TH $CV=$(Sum of all $CON_1$)/$CV_{count}$ In other words, when one of the pixel values exceeds the saturation threshold (saturation_TH), the summation of the convolution values would exclude that pixel, and the counting amount of all the convolution values ($CV_{count}$) will minus one. The saturation threshold is designated according to the hardware efficiency. Supposed that the highest value the pixel can output is 255, then, the saturation threshold can be designated as 250. Therefore, not only enough samples can be obtained for the calculation, but also those incorrect values can be excluded from the calculation.

Moreover, the calculation efficiency can be improved and the contrast values can be determined correctly.

Figure 5:
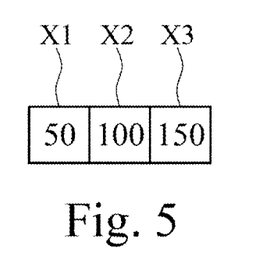
FIG. 5 illustrates a schematic view of pixels with 0 EV and less than the saturation threshold of one embodiment of the instant disclosure.
Figure 6:
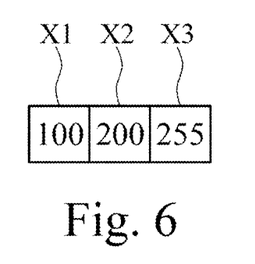
FIG. 6 illustrates a schematic view of pixels with +1 EV and greater than the saturation threshold of one embodiment of the instant disclosure.

FIG. 5 illustrates a schematic view of pixels with 0 EV and less than the saturation threshold. FIG. 6 illustrates a schematic view of pixels with +1 EV and greater than the saturation threshold. The pixel values shown in FIGS. 5 and 6 are taken as simple examples for the contrast value calculation.

FIG. 5 includes three pixels, the pixel value of the pixel X1 is 50, the pixel value of the pixel X2 is 100, the pixel value of the pixel X3 is 150, the saturation threshold (saturation_TH) is designated as 250, and the high pass filter applied to the calculation is Filter[1~−1].

$CON_{X1\text{-}X2}=[1\times50+-1\times100]=50$ $CON_{X2\text{-}X3}=[1\times100+-1\times150]=50$ $CV_{count}=2$ $CV=(CON_{X1\text{-}X2}+CON_{X2\text{-}X3})/CV_{count}=50$ FIG. 6 includes three pixels, the pixel value of the pixel X1 is 100, the pixel value of the pixel X2 is 200, the pixel value of the pixel X3 is 255, the saturation threshold (saturation_TH) is designated as 250, and the high pass filter applied to the calculation is Filter[1~−1]. Wherein, the pixel value of the pixel X3 exceeds the highest value the pixel can output. Therefore, the actual pixel value of the pixel X3 should be higher than 255.

$CON_{X1\text{-}X2}=[1\times100+-1\times200]=100$ $CON_{X2\text{-}X3}$ in which X3>saturation_TH $CV_{count}=2-1$ $CV=(CON_{X1\text{-}X2})/1=100$ Because the exposure values are different in FIGS. 5 and 6, the normalization procedure is further applied.

In FIG. 5, the exposure value is 0 EV, thus $CV=50\times2^{0-0}=50$.

In FIG. 6, the exposure value is +1 EV, thus $CV=100\times2^{0-1}=50$.

In addition, if the obtained images have too many noises, the determination and the calculation speed of the contrast values would be affected. Therefore, according to an auto focus method of a fourth embodiment of the instant disclosure, the convolution value of the selected pixels is the convolution value of all the pixels of the image excluding the convolution value of oversaturated pixels of the image and excluding the convolution value of noise pixels of the image.

In obtaining the contrast value according to the embodiment, following calculations are carried out:

Filter=[$a_1$ $a_2$ ... $a_n$]

$CON_1 = [a_1X1+a_2X2+ ... +a_nXn]$ if $X1$ $X2$ ... $Xn$<saturation_TH else $CON_2 = CON_1/2^{noise\_TH}$ If $CON_2 \geq 1$, then $CV_{count} = CV_{count}+1$ $CV$=(Sum of all $CON_2$)/$CV_{count}$ Wherein, noise_TH represents the noise threshold. When $CON_2 \geq 1$, the convolution value $CON_1$ is valid, and the $CV_{count}$ plus one (namely, $CV_{count} = CV_{count}+1$). Conversely, when $CON_2 < 1$, the convolution value $CON_1$ is indeed a noise and not be calculated. Hence, the $CV_{count}$ does not plus one.

In executing the focal point searching procedure (c), following embodiments may be applied. According to an auto focus method of a fifth embodiment of the instant disclosure, the reverse condition is satisfied when the normalized contrast values have a relative maximum value.

As mentioned in the foregoing embodiment, after the normalized contrast value obtaining procedure (b) is completed, the curve shown in FIG. 3 would be recovered to the curve shown in FIG. 1. After the calculation of the contrast values at all the stepping positions is completed, a relative maximum value among the normalized contrast values can be obtained correctly. For instance, in FIG. 1, the relative maximum value is cv50.

In an auto focus method of a sixth embodiment of the instant disclosure, it is no need to calculate all the contrast values at all the stepping positions, which is different from the fifth embodiment. Supposed that in a normal condition, each of the images has one optimal focal point, namely, the curve can have one highest value.

Figure 7:
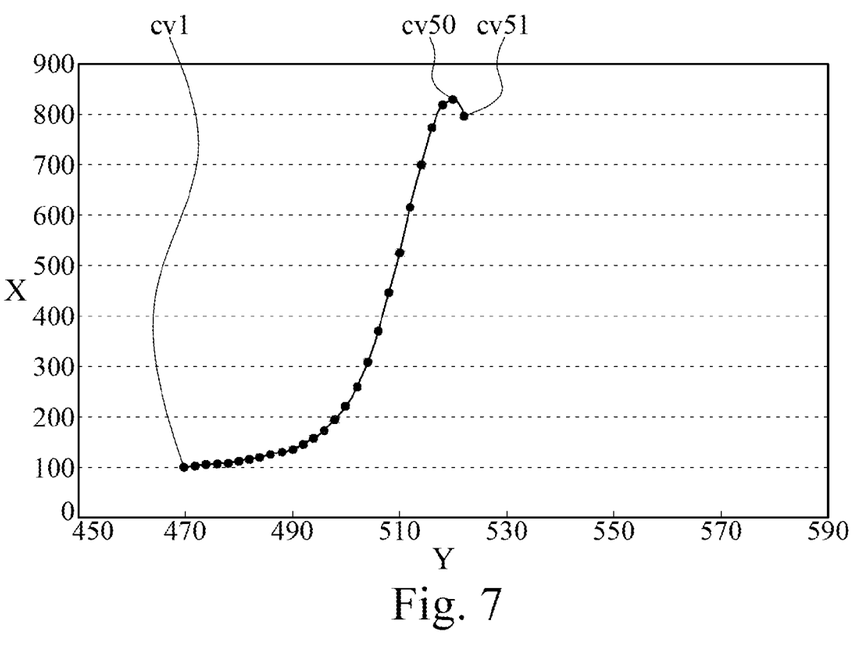
FIG. 7 illustrates a graph of the average contrast values at each of the stepping positions according to a sixth embodiment of the instant disclosure.

FIG. 7 illustrates a graph of the average contrast values at each of the stepping positions according to the sixth embodiment of the instant disclosure. During the auto focus procedure, the images are sequentially obtained at each of the stepping positions and the corresponding contrast values are calculated, so that it is determined if the current contrast value is greater than the previous contrast value. If the answer is yes, the image at the next stepping position is obtained and the contrast value of that image is calculated.

While if the answer is no, which means the current contrast value is less than the previous contrast value, or the position where the curve reverse occurs. In FIG. 7, the contrast values gradually increase from cv1 to cv50, while because cv51 is less than cv50, the reverse condition is satisfied accordingly.

Figure 8:
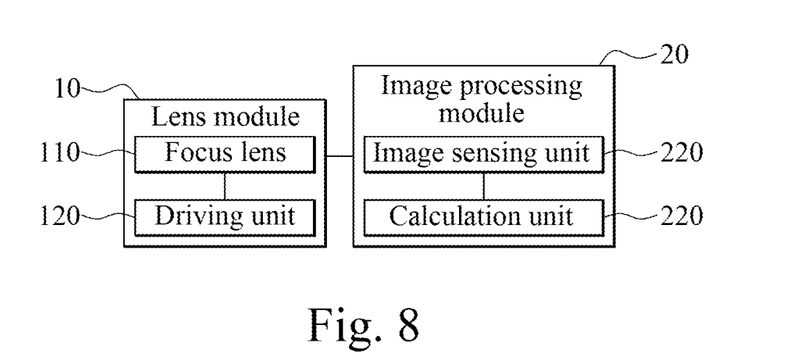
FIG. 8 illustrates a system block diagram of an image capturing apparatus of one embodiment of the instant disclosure.

FIG. 8 illustrates a system block diagram of an image capturing apparatus of one embodiment of the instant disclosure. An embodiment of the instant disclosure also provides an image capturing apparatus. The image capturing apparatus at least comprises a lens module 10 and an image processing module 20 for executing the aforementioned focus methods. The focus lens 110 of the lens module 10 is moved from a stepping position to a next stepping position by a driving unit 120. The image sensing unit 210 of the image processing module 20 obtains the image at each of the stepping positions, and the calculation and the normalization of the contrast values are performed by a calculation unit 220 of the image processing module 20. The normalized contrast value obtaining procedures (b) and the focal point searching procedure (c) described in different embodiments can be applied to the method freely for obtaining an optimal focus result.

When the image processing module 20 outputs a stepping position corresponding to the maximum normalized contrast value, the driving unit 120 moves the focus lens to the stepping position.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An auto focus method comprising:
   (a) obtaining a selected exposure value and an un-normalized contrast value, wherein the un-normalized contrast value corresponds to a stepping position;
   (b) executing a normalized contrast value obtaining procedure, wherein the normalized contrast value obtaining procedure comprises:
      (b1) obtaining a next un-normalized contrast value and a next exposure value of a next image at a next stepping position;
      (b2) determining if the next exposure value and the selected exposure value satisfy a renew condition, and renewing the selected exposure value when the next exposure value and the selected exposure value satisfy the renew condition; and
      (b3) obtaining a normalized contrast value corresponding to the un-normalized contrast value and a next normalized contrast value corresponding to the next un-normalized contrast value according to the renewed selected exposure value; and
   (c) executing a focal point searching procedure according to the normalized contrast value and the next normalized contrast value, wherein the focal point searching procedure comprises:
      (c1) determining if a reverse condition is satisfied according to the normalized contrast values;
      (c2) outputting the stepping position corresponding to the maximum of the normalized contrast values if the reverse condition is satisfied; and
      (c3) executing the normalized contrast value obtaining procedure if the reverse condition is not satisfied.

2. The auto focus method according to claim 1, wherein the step (a) comprises:
   obtaining a first image and a first exposure value and a first contrast value corresponding to the first image at a first stepping position; and
   setting the first exposure value as the selected value and setting the first contrast value as the un-normalized contrast value.

3. The auto focus method according to claim 1, wherein the renew condition is satisfied when the next exposure value is less than the selected exposure value, the step (b2) utilizes the next exposure value as the selected exposure value, and the step (b3) further comprises:
   obtaining the normalized contrast values according to a normalization formula, wherein the normalization formula is $CV_n = CV_i \times 2^{EVmin-EVi}$, wherein $CV_n$ are the normalized contrast values, $CV_i$ are the un-normalized contrast values, $EV_{min}$ is the selected exposure value, and the $EV_i$ are the exposure values.

4. The auto focus method according to claim 1, wherein the renew condition is satisfied when the next exposure value is greater than the selected exposure value, the step (b2) utilizes the next exposure value as the selected exposure value, and the step (b3) further comprises:

obtaining the normalized contrast values according to a normalization formula, wherein the normalization formula is $CV_n = CV_i \times 2^{EVmax-EVi}$, wherein $CV_n$ is the normalized contrast value, $CV_i$ is the un-normalized contrast value, $EV_{max}$ is the selected exposure value, and the $EV_i$ is the exposure value.

5. The auto focus method according to claim 1, wherein the un-normalized contrast value is the average of the convolution values of a plurality of selected pixels of each of the images corresponding to the corresponding stepping position.

6. The auto focus method according to claim 5, wherein the selected pixels comprise all the pixels of the image.

7. The auto focus method according to claim 5, wherein the convolution value of the selected pixels is the convolution value of all the pixels of the image excluding the convolution value of oversaturated pixels of the image.

8. The auto focus method according to claim 7, wherein the oversaturated pixel is a pixel having a pixel value greater than an oversaturation threshold.

9. The auto focus method according to claim 8, wherein the convolution value of the selected pixels is the convolution value of all the pixels of the image excluding the convolution value of oversaturated pixels of the image and excluding the convolution value of noise pixels of the image.

10. The auto focus method according to claim 9, wherein the reverse condition is satisfied when the normalized contrast values have a relative maximum value.

11. An image capturing apparatus for executing an auto focus method, wherein the method comprises:
(a) obtaining a selected exposure value and an un-normalized contrast value, wherein the un-normalized contrast value corresponds to a stepping position;
(b) executing a normalized contrast value obtaining procedure, wherein the normalized contrast value obtaining procedure comprises:
   (b1) obtaining a next un-normalized contrast value and a next exposure value of a next image at a next stepping position;
   (b2) determining if the next exposure value and the selected exposure value satisfy a renew condition, and renewing the selected exposure value when the next exposure value and the selected exposure value satisfy the renew condition; and
   (b3) obtaining a normalized contrast value corresponding to the un-normalized contrast value and a next normalized contrast value corresponding to the next un-normalized contrast value according to the renewed selected exposure value; and
(c) executing a focal point searching procedure according to the normalized contrast value and the next normalized contrast value, wherein the focal point searching procedure comprises:
   (c1) determining if a reverse condition is satisfied according to the normalized contrast values;
   (c2) outputting the stepping position corresponding to the maximum of the normalized contrast values if the reverse condition is satisfied; and
   (c3) executing the normalized contrast value obtaining procedure if the reverse condition is not satisfied.

12. The image capturing apparatus according to claim 11, wherein the step (a) comprises:

obtaining a first image and a first exposure value and a first contrast value corresponding to the first image at a first stepping position; and setting the first exposure value as the selected value and setting the first contrast value as the un-normalized contrast value.

13. The image capturing apparatus according to claim 11, wherein the renew condition is satisfied when the next exposure value is less than the selected exposure value, the step (b2) utilizes the next exposure value as the selected exposure value, and the step (b3) further comprises:

obtaining the normalized contrast values according to a normalization formula, wherein the normalization formula is $CV_n = CV_i \times 2^{EVmin-EVi}$ wherein $CV_n$ are the normalized contrast values, $CV_i$ are the un-normalized contrast values, $EV_{min}$ is the selected exposure value, and the $EV_i$ are the exposure values.

14. The image capturing apparatus according to claim 11, wherein the renew condition is satisfied when the next exposure value is greater than the selected exposure value, the step (b2) utilizes the next exposure value as the selected exposure value, and the step (b3) further comprises:

obtaining the normalized contrast values according to a normalization formula, wherein the normalization formula is $CV_n = CV_i \times 2^{EVmax-EVi}$, wherein $CV_n$ is the normalized contrast value, $CV_i$ is the un-normalized contrast value, $EV_{max}$ is the selected exposure value, and the $EV_i$ is the exposure value.

15. The image capturing apparatus according to claim 11, wherein the un-normalized contrast value is the average of the convolution values of a plurality of selected pixels of each of the images corresponding to the corresponding stepping position.

16. The image capturing apparatus according to claim 15, wherein the selected pixels comprise all the pixels of the image.

17. The image capturing apparatus according to claim 15, wherein the convolution value of the selected pixels is the convolution value of all the pixels of the image excluding the convolution value of oversaturated pixels of the image.

18. The image capturing apparatus according to claim 17, wherein the oversaturated pixel is a pixel having a pixel value greater than an oversaturation threshold.

19. The image capturing apparatus according claim 18, wherein the convolution value of the selected pixels is the convolution value of all the pixels of the image excluding the convolution value of oversaturated pixels of the image and excluding the convolution value of noise pixels of the image.

20. The image capturing apparatus according to claim 19, wherein the reverse condition is satisfied when the normalized contrast values have a relative maximum value.

* * * * *